US011892237B2

(12) United States Patent
Han et al.

(10) Patent No.: US 11,892,237 B2
(45) Date of Patent: Feb. 6, 2024

(54) DEVICE FOR DIVERSION OF QUENCHING WASTE GAS AND DIVERSION METHOD THEREOF

(71) Applicant: Yanshan University, Qinhuangdao (CN)

(72) Inventors: Yi Han, Qinhuangdao (CN); Dongyu Li, Qinhuangdao (CN); Yao Xiao, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 625 days.

(21) Appl. No.: 17/134,610

(22) Filed: Dec. 28, 2020

(65) Prior Publication Data

US 2021/0207889 A1 Jul. 8, 2021

(30) Foreign Application Priority Data

Jan. 3, 2020 (CN) ........................ 202010005745.2

(51) Int. Cl.

| | |
|---|---|
| ***H05B 6/10*** | (2006.01) |
| ***F27D 17/00*** | (2006.01) |
| *F27D 1/18* | (2006.01) |
| *F27D 7/04* | (2006.01) |
| *F27D 9/00* | (2006.01) |
| *F27D 19/00* | (2006.01) |

(52) U.S. Cl.
CPC .... *F27D 17/002* (2013.01); *F27D 2001/1891* (2013.01); *F27D 2007/045* (2013.01); *F27D 2009/0089* (2013.01); *F27D 2019/0015* (2013.01)

(58) Field of Classification Search
CPC ........... F27D 17/002; F27D 2001/1891; F27D 2007/045; F27D 2009/0089; F27D 2019/0015; H05B 6/10
USPC ....... 219/647, 635, 602, 628, 632, 645, 646, 219/649, 650, 651, 653, 654, 655, 657, 219/658; 373/138, 139, 140, 141
See application file for complete search history.

(56) References Cited

U.S. PATENT DOCUMENTS 2,695,475 A * 11/1954 Ellis ...................... C03B 27/067 219/650
6,492,631 B2 * 12/2002 Ninomiya ............ C21D 9/0062 219/651
10,315,247 B2 * 6/2019 Mark ...................... B22F 10/22

* cited by examiner

*Primary Examiner* — Quang T Van
(74) *Attorney, Agent, or Firm* — IPRO, PLLC

(57) ABSTRACT

The invention provides device for diversion of quenching exhaust gas and diversion method, exhaust gas chamber is located at top of quenching chamber; quenching chamber is fixedly connected to exhaust gas chamber through partition; support plate in lifting assembly is fixedly connected to side of partition, motor in exhaust assembly is fixedly connected to slider in lifting assembly, two adjacent sides of quenching chamber are fixedly connected to lower surface of support plate through triangular support frame; sealing brushes are located on two adjacent sides of exhaust chamber, gas detector is located inside exhaust chamber on one side near the top, exhaust cylinder is located at center of upper surface of top of exhaust chamber, first end of slider support column and motor support seat are respectively located on upper surface of support plate, second end is fixedly connected with lower surface of baffle through cylindrical hole of slider.

6 Claims, 5 Drawing Sheets

DEVICE FOR DIVERSION OF QUENCHING WASTE GAS AND DIVERSION METHOD THEREOF

TECHNICAL FIELD

The invention relates to the technical field of quenching exhaust gas treatment, in particular to a device for diversion of quenching exhaust gas and a diversion method thereof.

BACKGROUND

In the metal heat treatment industry, quenching is one of the most important processes. The purpose of parts quenching is to substantially improve the strength, hardness and wear resistance of steel, so as to meet the different needs of various mechanical parts and tools for use. However, at the moment of quenching by the open quenching equipment, a large amount of oily fume and exhaust gas will be discharged into the workshop, which not only pollutes the workshop environment and seriously endangers the health and safety of employees, but also presents fire hazards. The extensive high-power fan has a large tuyere, which has an impact on precise heating. In order to change the gas flow direction, a gas diversion device is needed. In order to increase the gas flow stroke, it is usually necessary to adjust the gas flow trajectory to a spiral trajectory. In the prior art, the trajectory is usually through a spiral tube or a spiral plate, which has a complicated structure and affects workers' handling and real-time monitoring.

Therefore, how to accurately control the direction of exhaust gas while avoiding the influence of the fan on precise heating is an urgent problem for those skilled in the art.

SUMMARY OF THE INVENTION

In view of the problems in the prior art, the present invention provides a device for diversion of quenching exhaust gas and a diversion method thereof, mainly for reducing the complexity of the structure, realizing real-time monitoring, accurately controlling the direction of the exhaust gas, and avoiding the influence of the exhaust fan on the precise heating of the workpiece during work.

The invention provides a device for diversion of quenching exhaust gas, comprising a quenching chamber, an exhaust gas chamber, a lifting assembly and a exhaust assembly, wherein the exhaust gas chamber is located at the top of the quenching chamber; the quenching chamber is fixedly connected to the exhaust gas chamber through the partition; the support plate in the lifting assembly is fixedly connected to the side of the partition, and the motor in the exhaust assembly is fixedly connected to the slider in the lifting assembly;

the quenching chamber includes a quenching chamber door, an induction coil, a workpiece, a base and a triangular support frame; the quenching chamber door is located on one side of the quenching chamber; one end surface of the quenching chamber door is fixedly connected to a side surface of the quenching chamber; the induction coil and the workpiece are concentric and not in contact; the workpiece is located inside the quenching chamber; the upper surface of the base is fixedly connected to the lower surface of the bottom of the quenching chamber; the upper surface of the top of the quenching chamber and the lower surface of the partition are fixedly connected, and the two adjacent sides of the quenching chamber are fixedly connected to the lower surface of the first support plate and the lower surface of the second support plate through the triangular support frame respectively;

the exhaust gas chamber includes a exhaust gas chamber door, a sealing brush, a partition, an exhaust cylinder and a gas detector; the exhaust gas chamber door is located on one side of the exhaust gas chamber; one end surface of the exhaust gas chamber door and one side surface of the exhaust gas chamber are fixedly connected; the partition is provided with a cylindrical through-hole at a position corresponding to the workpiece, a side corner of the partition is provided with a small opening, the bottom surface of the bottom of the exhaust gas chamber and the upper surface of the partition are fixedly connected, the sealing brush is located on two adjacent sides of the exhaust gas chamber, and the exhaust cylinder is located at the center of the upper surface of the top of the exhaust gas chamber, the gas detector is located inside the exhaust chamber, on one side near the top;

the exhaust assembly includes a Z-axis exhaust fan, a Y-axis exhaust fan, an X-axis exhaust fan, a third motor, a fourth motor, and a fifth motor; the input end of the X-axis exhaust fan is fixedly connected to the output end of the third motor through the sealing brush, the housing of the third motor is fixedly connected to the middle of the first slider, and the input end of the Y-axis exhaust fan is fixedly connected to the output end of the fourth motor through the sealing brush, the housing of the fourth motor is fixedly connected to the middle of the second slider, the input end of the Z-axis exhaust fan is fixedly connected to the output end of the fifth motor, the housing of the fifth motor is fixedly connected to the lower surface of the top of the exhaust chamber; and the lifting assembly includes a first baffle, a first slider support column, a first screw, a first slider, a first motor support seat, and a first support plate, a second baffle, a second slider support column, a second screw, a second slider, a second motor support seat, a second support plate, a first motor and a second motor; the first end of the first slider support column and the first motor support seat are respectively located on the upper surface of the first support plate, and the first end of the first screw is fixedly connected to the first motor through the first motor support seat, the first end of the second slider support column and the second motor support seat are respectively located on the upper surface of the second support plate, and the first end of the second screw is fixedly connected to the second motor through the second motor support seat; the second end of the first slider support column and the second end of the second slider support column are fixedly connected to the lower surface of a baffle and the lower surface of the second baffle through the cylindrical hole of the first slider and the cylindrical hole of the second slider respectively; the second end of the first screw and the second end of the second screw are fixedly connected to the lower surface of the first baffle and the lower surface of the second baffle through the threaded hole of the first slider and the threaded hole of the second slider respectively.

Preferably, the thickness of the first support plate, the thickness of the second support plate, and the thickness of the partition are equal.

Preferably, the axes of the X-axis exhaust fan and the Y-axis exhaust fan are parallel to the upper surface of the partition, and the axis of the Z-axis exhaust fan is perpendicular to the upper surface of the partition.

Preferably, the cross-sections of the first slider and the second slider have a "T" structure shaped like a laid flat "T";

one side surface of the first slider and one side surface of the second slider are respectively provided with a cylindrical hole and a threaded hole; the diameter of the cylindrical hole of the first slider and the diameter of the cylindrical hole of the second slider are respectively equal to the outer diameter of the first slider support column and the outer diameter of the second slider support column; the threaded hole of the first slider and the threaded hole of the second slider are threaded with the first screw and the second screw, respectively.

Preferably, the axis of the first slider support column and the axis of the first screw are parallel to each other, and the axis of the second slider support column and the axis of the second screw are parallel to each other; the first baffle and the first support plate are parallel to each other, and the second baffle and the second support plate are parallel to each other.

Another aspect of the present invention provides a diversion method using the device for diversion of quenching exhaust gas, which includes the following steps:

S1, after the exhaust gas is produced by quenching the workpiece, the third motor connected to the X-axis exhaust fan, the fourth motor connected to the Y-axis exhaust fan and the fifth motor connected to the Z-axis exhaust fan are started so that they start running at a power of 2 kw respectively;

S2, start the gas detector in the machine vision to monitor the concentration of exhaust gas discharged from the quenching chamber to the exhaust chamber in real time;

S3, according to the exhaust gas concentration monitored by the gas detector, the power of the third motor connected to the X-axis exhaust fan and the fourth motor connected to the Y-axis exhaust fan is adjusted in real time, and the power of the X-direction exhaust fan and Y-direction exhaust fan is changed in real time by comparison of the X-direction and Y-direction exhaust gas concentrations in the exhaust gas chamber by the gas detector, and the power adjustment range of the X direction exhaust fan and the Y direction exhaust fan is 2~2.5 kw;

S31, when the gas detector detects that the exhaust gas concentration of the negative half axis of the X-axis is relatively large, the power of the third motor connected to the X-axis exhaust fan is increased, and then the speed of the X-axis exhaust fan increases; the power of the fourth motor connected to the Y-axis exhaust fan remains unchanged, and then the speed of the Y-axis exhaust fan remains unchanged; the exhaust gas starts to move from the negative half axis of the X-axis with high concentration to the positive half axis of the X-axis with low concentration, and is discharged through the exhaust cylinder at the top center of the exhaust chamber;

S32, when the gas detector detects that the exhaust gas concentration of the positive half axis of the X-axis is relatively large, the power of the third motor connected to the X-axis exhaust fan is reduced, and then the speed of the X-axis exhaust fan decreases; the power of the fourth motor connected to the Y-axis exhaust fan remains unchanged, and then the speed of the Y-axis exhaust fan remains unchanged; the exhaust gas starts to move from the positive half axis of the X-axis with high concentration to the negative half axis of the X-axis with low concentration, and is discharged through the exhaust cylinder at the top center of the exhaust chamber;

S33, when the gas detector detects that the exhaust gas concentration of the positive half axis of the Y-axis is relatively large, the power of the third motor connected to the X-axis exhaust fan remains unchanged, and then the speed of the X-axis exhaust fan remains unchanged; the power of the fourth motor connected to the Y-axis exhaust fan is reduced, and then the speed of the Y-axis exhaust fan decreases; the exhaust gas starts to move from the positive half axis of the Y-axis with high concentration and the negative half axis of the Y-axis with low concentration, and is discharged through the exhaust cylinder at the top center of the exhaust chamber;

S34, when the gas detector detects that the exhaust gas concentration of the negative half axis of the Y-axis is relatively large, the power of the third motor connected to the X-axis exhaust fan remains unchanged, and then the speed of the X-axis exhaust fan remains unchanged; the power of the fourth motor connected to the Y-axis exhaust fan increases, and then the speed of the Y-axis exhaust fan increases; the exhaust gas starts to move from the negative half axis of the Y-axis with high concentration to the positive half axis of the Y-axis with low concentration, and is discharged through the exhaust cylinder at the top center of the exhaust chamber;

S35, when the gas detector detects that the exhaust gas concentration in the third quadrant of the coordinate system is relatively large, the power of the third motor connected to the X-axis exhaust fan increases, and then the speed of the X-axis exhaust fan increases; the power of the fourth motor connected to the Y-axis exhaust fan increases, and then the speed of the Y-axis exhaust fan increases; the exhaust gas starts to move from the third quadrant with high concentration to the positive half axis of the X-axis and the positive half axis of the Y-axis with low concentration, and is discharged through the exhaust cylinder at the top center of the exhaust chamber;

S36, when the gas detector detects that the exhaust gas concentration in the fourth quadrant of the coordinate system is relatively large, the power of the third motor connected to the X-axis exhaust fan is reduced, and then the speed of the X-axis exhaust fan is reduced; the power of the fourth motor connected to the Y-axis exhaust fan increases, and then the speed of the Y-axis exhaust fan increases; the exhaust gas starts to move from the fourth quadrant with high concentration to the negative half axis of the X-axis and the positive half axis of the Y-axis with low concentration, and is discharged through the exhaust cylinder at the top center of the exhaust chamber;

S37, when the gas detector detects that the exhaust gas concentration in the second quadrant of the coordinate system is relatively large, the power of the third motor connected to the X-axis exhaust fan increases, and then the speed of the X-axis exhaust fan increases; the power of the fourth motor connected to the Y-axis exhaust fan decreases, and then the speed of the Y-axis exhaust fan decreases; the exhaust gas starts to move from the second quadrant with high concentration to the positive half axis of the X-axis and the negative half axis of the Y-axis with low concentration, and is discharged through the exhaust cylinder at the top center of the exhaust chamber;

S38, when the gas detector detects that the exhaust gas concentration in the first quadrant of the coordinate system is relatively large, the power of the third motor connected to the X-axis exhaust fan is reduced, and then the speed of the X-axis exhaust fan decreases; the power of the fourth motor connected to the Y-axis exhaust fan 6 decreases, and then the speed of the Y-axis exhaust fan decreases; the exhaust gas starts to move from the first quadrant with high concentration to the negative half axis of the X-axis and the negative half axis of the Y-axis with low concentration, and is discharged through the exhaust cylinder at the top center of the exhaust chamber;

S4, start the lifting assembly, adjust the first motor connected to the first screw and the second motor connected to the second screw, so that the first screw and the second screw rotate to drive the first slider and the second slider respectively up and down along the first slider support column and the second slider support column at a speed of 0.2-0.3 m/s;

S5, after the exhaust gas is discharged from the exhaust chamber, the third motor connected to the X-axis exhaust fan stops, then the X-axis exhaust fan stops, and the fourth motor connected to the Y-axis exhaust fan stops, and then the Y-axis exhaust fan stops, and then the first slider and the second slider of the lifting assembly drive the X-axis exhaust fans and the Y-axis exhaust fan in the exhaust assembly back to the initial position along the first slider support column and the second slider support column respectively, to complete the reset operation.

Compared with the prior art, the present invention has the following advantages:

determine the distribution of exhaust gas in the direction of the XYZ axis in space through machine vision, so as to adjust the power of the exhaust fan, accurately control the exhaust gas gathered in the shared air duct (Z axis) in the XYZ coordinate system, and divide the quenching of the workpiece and the exhaust gas emissions into the quenching chamber and the exhaust gas chamber; a small opening is opened at a side corner of the partition to avoid the influence of the high-power exhaust fan on the precise heating of the workpiece during work; the change in the concentration of exhaust gas detected by the gas detector is fed back to the motor driving the exhaust fan in real time, realizing real-time control. After the exhaust gas is directed through the exhaust cylinder, it can enter the exhaust gas treatment system, while avoiding the environmental pollution caused by the workpiece quenching exhaust gas.

MAIN REFERENCE SIGNS

Figure 1:
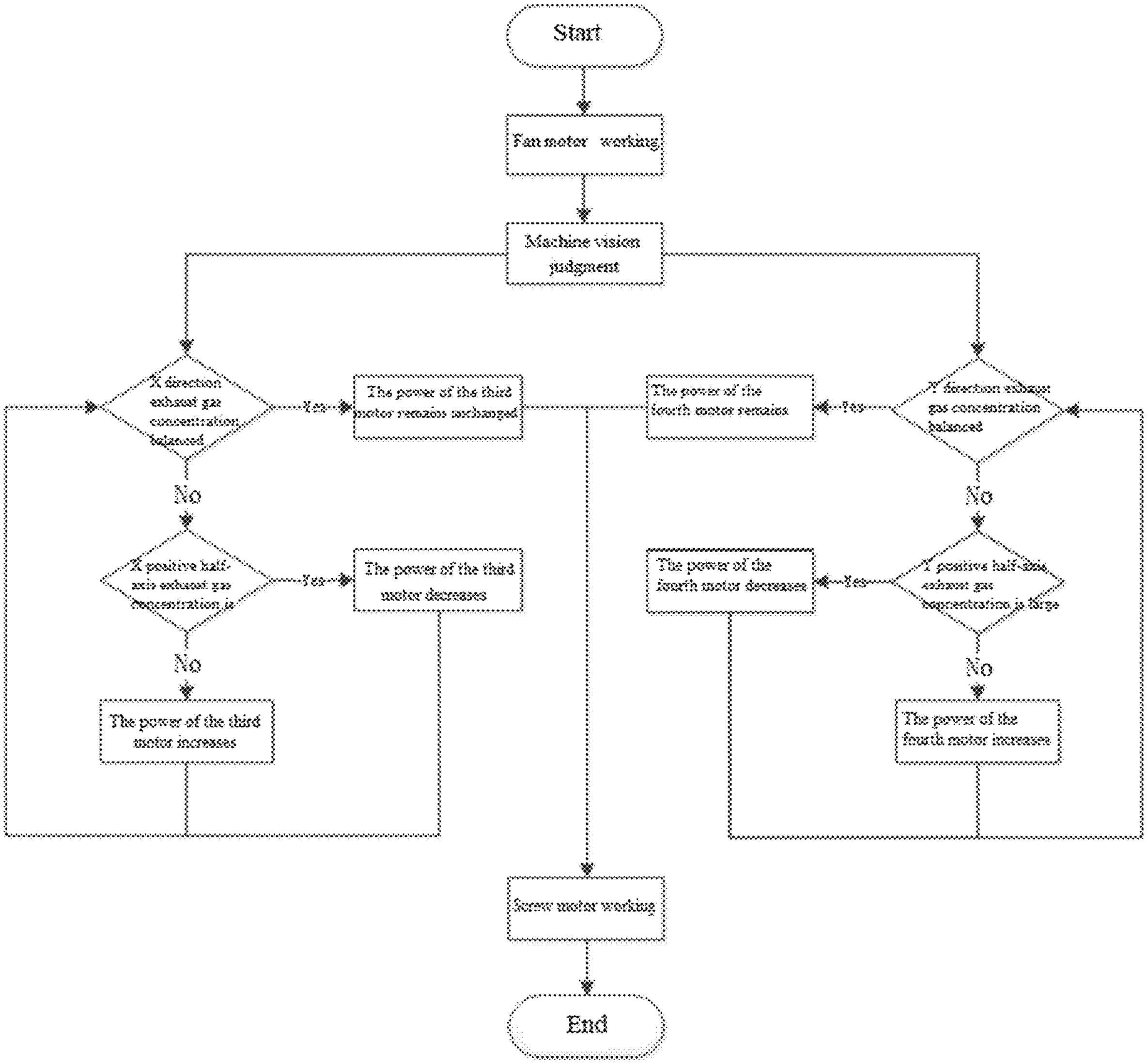
FIG. 1 is a control flow chart of the device for diversion of quenching exhaust gas and the diversion method thereof according to the present invention.

Exhaust cylinder 1, gas detector 2, Z-axis exhaust fan 3, sealing brush 4, exhaust gas chamber door 5, Y-axis exhaust fan 6, X-axis exhaust fan 7, partition 8, induction coil 9, workpiece 10, quenching chamber door 11, fifth motor 12, first baffle 13, first slider support column 14, first screw 15, third motor 16, first slider 17, first motor support seat 18, first support plate 19, triangular support frame 20, base 21, first motor 22, second baffle 23, second slider support column 24, second screw 25, fourth motor 26, second slider 27, second motor support seat 28, second motor 29, and second support plate 30.

DETAILED DESCRIPTION

In order to detail the technical content, structural features, achieved objectives and effects of the present invention, a detailed description will be given below in conjunction with the accompanying drawings of the specification.

Figure 4:
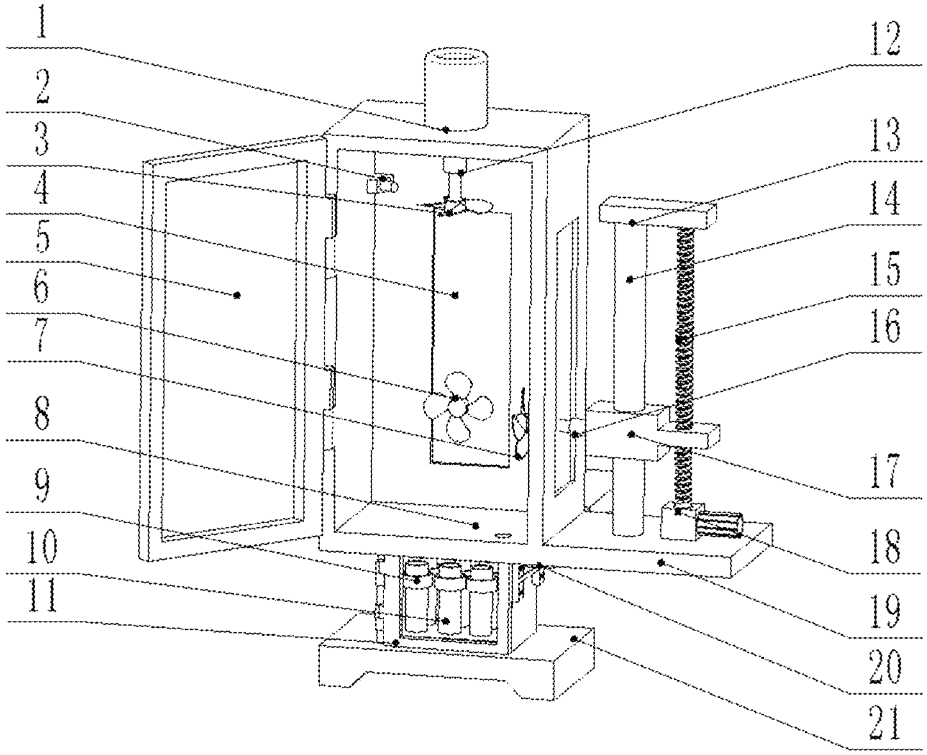
FIG. 4 is a front view of the device for diversion of quenching exhaust gas and the diversion method thereof according to the present invention.

The device for diversion of quenching exhaust gas and the diversion method thereof, as shown in FIG. 4, include a quenching chamber, an exhaust gas chamber, a lifting assembly and a exhaust assembly. The exhaust gas chamber is located at the top of the quenching chamber. The quenching chamber is fixedly connected to the exhaust gas chamber through the partition 8; the support plate in the lifting assembly is fixedly connected to the side of the partition 8, and the motor in the exhaust assembly is fixedly connected to the slider in the lifting assembly. The lifting assembly can drive the exhaust assembly to move up and down.

The quenching chamber, as shown in FIG. 4, includes a quenching chamber door 11, an induction coil 9, a workpiece 10, a base 21 and a triangular support frame 20. The shape of the quenching chamber is a rectangular parallelepiped structure, and the quenching chamber door 11 is located on one side of the quenching chamber. One end surface of the quenching chamber door 11 is fixedly connected to a side surface of the quenching chamber. The induction coil 9 and the workpiece 10 are concentric and not in contact. The workpiece 10 is located inside the quenching chamber. The upper surface of the base 21 is fixedly connected to the lower surface of the bottom of the quenching chamber. The upper surface of the top of the quenching chamber and the lower surface of the partition 8 are fixedly connected, and the two adjacent sides of the quenching chamber are fixedly connected to the lower surface of the first support plate 19 and the lower surface of the second support plate 30 through the triangular support frame 20 respectively.

The exhaust gas chamber, as shown in FIG. 4, includes a exhaust gas chamber door 5, a sealing brush 4, a partition 8, an exhaust cylinder 1 and a gas detector 2. The shape of the exhaust gas chamber is a rectangular parallelepiped structure. The exhaust gas chamber door 5 is located on one side of the exhaust gas chamber. One end surface of the exhaust gas chamber door 5 and one side surface of the exhaust gas chamber are fixedly connected. The partition 8 is provided with a cylindrical through-hole at a position corresponding to the workpiece 10, a side corner of the partition 8 is provided with a small opening, the bottom surface of the bottom of the exhaust gas chamber and the upper surface of the partition 8 are fixedly connected, the sealing brush 4 is located on two adjacent sides of the exhaust gas chamber, and the exhaust cylinder 1 is located at the center of the upper surface of the top of the exhaust gas chamber, the gas detector 2 is located inside the exhaust chamber, on one side near the top.

The exhaust assembly, as shown in FIG. 4, includes a Z-axis exhaust fan 3, a Y-axis exhaust fan 6, an X-axis exhaust fan 7, a third motor 16, a fourth motor 26, and a fifth motor 12. The input end of the X-axis exhaust fan 7 is fixedly connected to the output end of the third motor 16 through the sealing brush 4, the housing of the third motor 16 is fixedly connected to the middle of the first slider 17, and the input end of the Y-axis exhaust fan 6 is fixedly connected to the output end of the fourth motor 26 through the sealing brush, the housing of the fourth motor 26 is fixedly connected to the middle of the second slider 27, the input end of the Z-axis exhaust fan 3 is fixedly connected to the output end of the fifth motor 12, the housing of the fifth motor 12 is fixedly connected to the lower surface of the top of the exhaust chamber, and the Z-axis exhaust fan 3 is in communication with the exhaust cylinder 1.

Figure 5:
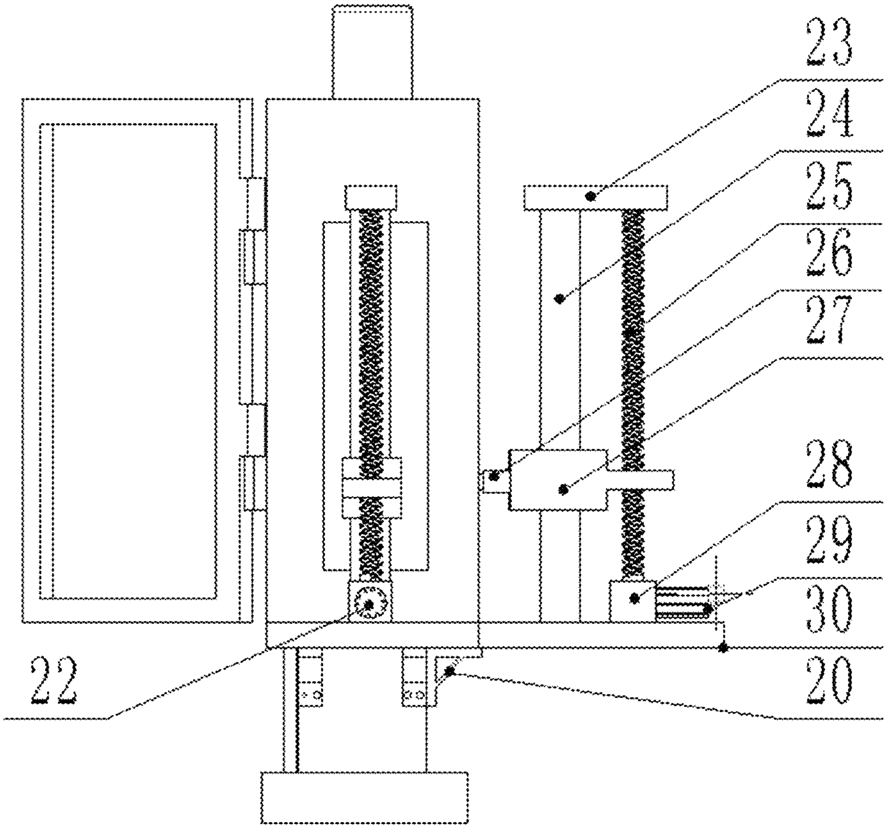
FIG. 5 is a right side view of the device for diversion of quenching exhaust gas and the diversion method thereof according to the present invention.

The lifting assembly, as shown in FIGS. 4 and 5, includes a first baffle 13, a first slider support column 14, a first screw 15, a first slider 17, a first motor support seat 18, and a first support plate 19, a second baffle 23, a second slider support column 24, a second screw 25, a second support plate 30, a second motor support seat 28, a second slider 27, a first motor 22 and a second motor 29.

The first end of the first slider support column 14 and the first motor support seat 18 are respectively located on the upper surface of the first support plate 19, and the first end of the first screw 15 is fixedly connected to the first motor 22 through the first motor support seat 18, the first end of the second slider support column 24 and the second motor support seat 28 are respectively located on the upper surface of the second support plate 30, and the first end of the second screw 25 is fixedly connected to the second motor 29 through the second motor support seat 28. The second end of the first slider support column 14 and the second end of the second slider support column 24 are fixedly connected to the lower surface of a baffle 13 and the lower surface of the second baffle 23 through the cylindrical hole of the first slider 17 and the cylindrical hole of the second slider 27 respectively. The second end of the first screw 15 and the second end of the second screw 25 are fixedly connected to the lower surface of the first baffle 13 and the lower surface of the second baffle 23 through the threaded hole of the first slider 17 and the threaded hole of the second slider 27 respectively.

The thickness of the first support plate 19, the thickness of the second support plate 30, and the thickness of the partition 8 are equal.

The axes of the X-axis exhaust fan 7 and the Y-axis exhaust fan 6 are parallel to the upper surface of the partition 8, and the axis of the Z-axis exhaust fan 3 is perpendicular to the upper surface of the partition 8.

The cross-sections of the first slider 17 and the second slider 27 have a "T" structure shaped like a laid flat "T". One side surface of the first slider 17 and one side surface of the second slider 27 are respectively provided with a cylindrical hole and a threaded hole. The diameter of the cylindrical hole of the first slider 17 and the diameter of the cylindrical hole of the second slider 27 are respectively equal to the outer diameter of the first slider support column 14 and the outer diameter of the second slider support column 24. The threaded hole of the first slider 17 and the threaded hole of the second slider 27 are threaded with the first screw 15 and the second screw 25, respectively.

As shown in FIGS. 4 and 5, the axis of the first slider support column 14 and the axis of the first screw 15 are parallel to each other, and the axis of the second slider support column 24 and the axis of the second screw 25 are parallel to each other. The first baffle 13 and the first support plate 19 are parallel to each other, and the second baffle 23 and the second support plate 30 are parallel to each other.

As shown in FIG. 1, the diversion method of the device for diversion of quenching exhaust gas includes the following steps:

S1. After the exhaust gas is produced by quenching the workpiece 10, the third motor 16 connected to the X-axis exhaust fan 7, the fourth motor 26 connected to the Y-axis exhaust fan 6 and the fifth motor 12 connected to the Z-axis exhaust fan 3 are started so that they start running at a power of 2 kw respectively;

S2. Start the gas detector 2 in the machine vision to monitor the concentration of exhaust gas discharged from the quenching chamber to the exhaust chamber in real time;

S3. According to the exhaust gas concentration monitored by the gas detector 2, the power of the third motor 16 connected to the X-axis exhaust fan 7 and the fourth motor 26 connected to the Y-axis exhaust fan 6 is adjusted in real time, and the power of the X-direction exhaust fan 7 and Y-direction exhaust fan 6 is changed in real time by comparison of the X-direction and Y-direction exhaust gas concentrations in the exhaust gas chamber by the gas detector 2, and the power adjustment range of the X direction exhaust fan 7 and the Y direction exhaust fan 6 is 2~2.5 kw;

S31. When the gas detector 2 detects that the exhaust gas concentration of the negative half axis of the X-axis is relatively large, the power of the third motor 16 connected to the X-axis exhaust fan 7 is increased, and then the speed of the X-axis exhaust fan 7 increases. The power of the fourth motor 26 connected to the Y-axis exhaust fan 6 remains unchanged, and then the speed of the Y-axis exhaust fan 6 remains unchanged. The exhaust gas starts to move from the negative half axis of the X-axis with high concentration to the positive half axis of the X-axis with low concentration, and is discharged through the exhaust cylinder 1 at the top center of the exhaust chamber;

S32. When the gas detector 2 detects that the exhaust gas concentration of the positive half axis of the X-axis is relatively large, the power of the third motor 16 connected to the X-axis exhaust fan 7 is reduced, and then the speed of the X-axis exhaust fan 7 decreases. The power of the fourth motor 26 connected to the Y-axis exhaust fan 6 remains unchanged, and then the speed of the Y-axis exhaust fan 6 remains unchanged. The exhaust gas starts to move from the positive half axis of the X-axis with high concentration to the negative half axis of the X-axis with low concentration, and is discharged through the exhaust cylinder 1 at the top center of the exhaust chamber;

S33. When the gas detector 2 detects that the exhaust gas concentration of the positive half axis of the Y-axis is relatively large, the power of the third motor 16 connected to the X-axis exhaust fan 7 remains unchanged, and then the speed of the X-axis exhaust fan 7 remains unchanged. The power of the fourth motor 26 connected to the Y-axis exhaust fan 6 is reduced, and then the speed of the Y-axis exhaust fan 6 decreases. The exhaust gas starts to move from the positive half axis of the Y-axis with high concentration and the negative half axis of the Y-axis with low concentration, and is discharged through the exhaust cylinder 1 at the top center of the exhaust chamber;

S34. When the gas detector 2 detects that the exhaust gas concentration of the negative half axis of the Y-axis is relatively large, the power of the third motor 16 connected to the X-axis exhaust fan 7 remains unchanged, and then the speed of the X-axis exhaust fan 7 remains unchanged. The power of the fourth motor 26 connected to the Y-axis exhaust fan 6 increases, and then the speed of the Y-axis exhaust fan 6 increases. The exhaust gas starts to move from the negative half axis of the Y-axis with high concentration to the positive half axis of the Y-axis with low concentration, and is discharged through the exhaust cylinder 1 at the top center of the exhaust chamber;

S35. When the gas detector 2 detects that the exhaust gas concentration in the third quadrant of the coordinate system is relatively large, the power of the third motor 16 connected to the X-axis exhaust fan 7 increases, and then the speed of the X-axis exhaust fan 7 increases. The power of the fourth motor 26 connected to the Y-axis exhaust fan 6 increases, and then the speed of the Y-axis exhaust fan 6 increases. The exhaust gas starts to move from the third quadrant with high concentration to the positive half axis of the X-axis and the positive half axis of the Y-axis with low concentration, and is discharged through the exhaust cylinder 1 at the top center of the exhaust chamber;

S36. When the gas detector 2 detects that the exhaust gas concentration in the fourth quadrant of the coordinate system is relatively large, the power of the third motor 16 connected to the X-axis exhaust fan 7 is reduced, and then the speed of the X-axis exhaust fan 7 is reduced. The power of the fourth motor 26 connected to the Y-axis exhaust fan 6 increases, and then the speed of the Y-axis exhaust fan 6 increases. The exhaust gas starts to move from the fourth quadrant with high concentration to the negative half axis of the X-axis and the positive half axis of the Y-axis with low concentration, and is discharged through the exhaust cylinder 1 at the top center of the exhaust chamber;

S37. When the gas detector 2 detects that the exhaust gas concentration in the second quadrant of the coordinate system is relatively large, the power of the third motor 16 connected to the X-axis exhaust fan 7 increases, and then the speed of the X-axis exhaust fan 7 increases. The power of the fourth motor 26 connected to the Y-axis exhaust fan 6 decreases, and then the speed of the Y-axis exhaust fan 6 decreases. The exhaust gas starts to move from the second quadrant with high concentration to the positive half axis of the X-axis and the negative half axis of the Y-axis with low concentration, and is discharged through the exhaust cylinder 1 at the top center of the exhaust chamber;

S38. When the gas detector 2 detects that the exhaust gas concentration in the first quadrant of the coordinate system is relatively large, the power of the third motor 16 connected to the X-axis exhaust fan 7 is reduced, and then the speed of the X-axis exhaust fan 7 decreases. The power of the fourth motor 26 connected to the Y-axis exhaust fan 6 decreases, and then the speed of the Y-axis exhaust fan 6 decreases. The exhaust gas starts to move from the first quadrant with high concentration to the negative half axis of the X-axis and the negative half axis of the Y-axis with low concentration, and is discharged through the exhaust cylinder 1 at the top center of the exhaust chamber;

S4. Start the lifting assembly, adjust the first motor 22 connected to the first screw 15 and the second motor 29 connected to the second screw 25, so that the first screw 15 and the second screw 25 rotate to drive the first slider 17 and the second slider 27 respectively up and down along the first slider support column 14 and the second slider support column 24 at a speed of 0.2-0.3 m/s;

S5. After the exhaust gas is discharged from the exhaust chamber, the third motor 16 connected to the X-axis exhaust fan 7 stops, then the X-axis exhaust fan 7 stops, and the fourth motor 26 connected to the Y-axis exhaust fan 6 stops, and then the Y-axis exhaust fan 6 stops, and then the first slider 17 and the second slider 27 of the lifting assembly drive the X-axis exhaust fans 7 and the Y-axis exhaust fan 6 in the exhaust assembly back to the initial position along the first slider support column 14 and the second slider support column 24 respectively, to complete the reset operation.

The device for diversion of quenching exhaust gas and the diversion method thereof according to the present invention will be further described in the following embodiments:

The Cartesian coordinate system of the device for diversion of quenching exhaust gas is defined with the origin of the coordinate system at the bottom center of the exhaust gas chamber, the axes of the X axis and the X-axis exhaust fan 7 coincide, and the positive direction of the X axis points to the X-axis exhaust fan 7; the axes of the Y axis and Y-axes exhaust fan 6 coincide, and the positive direction of the Y axis points to the Y-axis exhaust fan 6; the axes of the Z axis and the Z-axis exhaust fan 3 coincide, and the positive direction of the Z axis points to the Z-axis exhaust fan 3.

The steel is quenched by induction heating, which produces a large amount of exhaust gas. In order to achieve rapid exhaust gas emission and ensure accurate heating, the device for diversion of quenching exhaust gas is used for relevant treatment.

First, put the workpiece 10, such as steel, into the quenching chamber, and close the quenching chamber door 11 and the exhaust gas chamber door 5. The exhaust gas is generated during the quenching of the workpiece 10, and the exhaust gas enters the exhaust gas chamber through the cylindrical hole on the partition 8; then, start the third motor 16 connected to the X-axis exhaust fan 7, the fourth motor 26 connected to the Y-axis exhaust fan 6 and the fifth motor 12 connected to the Z-axis exhaust fan 3, respectively, so that they start to operate with a power of 2 kw.

Then, start the gas detector 2 in the machine vision to monitor the concentration of exhaust gas discharged from the quenching chamber to the exhaust gas chamber in real time. The power of the X-direction exhaust fan 7 and Y-direction exhaust fan 6 is changed in real time by comparison of the X-direction and Y-direction exhaust gas concentrations in the exhaust gas chamber by the gas detector 2, and the X-direction exhaust fan 7 and the Y-direction exhaust fan 6 operate at a power of 2 kw.

Figure 2A:
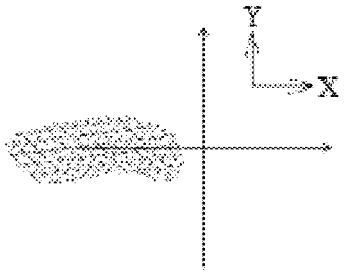
FIG. 2A-D is a schematic diagram of the first concentration distribution of the device for diversion of quenching exhaust gas and the diversion method thereof according to the present invention.

As shown in FIG. 2A, when the gas detector 2 detects that the exhaust gas concentration of the negative half axis of the X-axis is relatively large, the power of the third motor 16 connected to the X-axis exhaust fan 7 is increased, and then the speed of the X-axis exhaust fan 7 increases. The power of the fourth motor 26 connected to the Y-axis exhaust fan 6 remains unchanged, and then the speed of the Y-axis exhaust fan 6 remains unchanged. The exhaust gas starts to move from the negative half axis of the X-axis with high concentration to the positive half axis of the X-axis with low concentration, and is discharged through the exhaust cylinder 1 at the top center of the exhaust chamber.

Figure 2B:
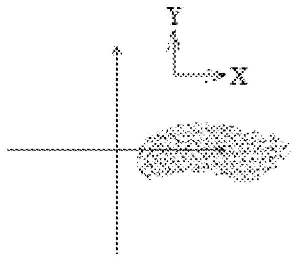

As shown in FIG. 2B, when the gas detector 2 detects that the exhaust gas concentration of the positive half axis of the X-axis is relatively large, the power of the third motor 16 connected to the X-axis exhaust fan 7 is reduced, and then the speed of the X-axis exhaust fan 7 decreases. The power of the fourth motor 26 connected to the Y-axis exhaust fan 6 remains unchanged, and then the speed of the Y-axis exhaust fan 6 remains unchanged. The exhaust gas starts to move from the positive half axis of the X-axis with high concentration to the negative half axis of the X-axis with low concentration, and is discharged through the exhaust cylinder 1 at the top center of the exhaust chamber.

Figure 2C:
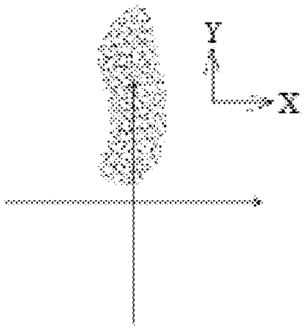

As shown in FIG. 2C, when the gas detector 2 detects that the exhaust gas concentration of the positive half axis of the Y-axis is relatively large, the power of the third motor 16 connected to the X-axis exhaust fan 7 remains unchanged, and then the speed of the X-axis exhaust fan 7 remains unchanged. The power of the fourth motor 26 connected to the Y-axis exhaust fan 6 is reduced, and then the speed of the Y-axis exhaust fan 6 decreases. The exhaust gas starts to move from the positive half axis of the Y-axis with high concentration and the negative half axis of the Y-axis with low concentration, and is discharged through the exhaust cylinder 1 at the top center of the exhaust chamber.

Figure 2D:
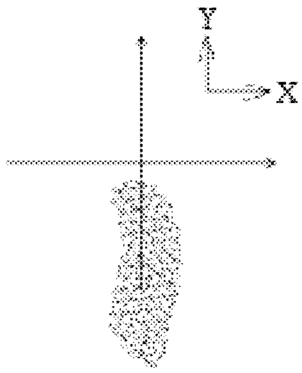

As shown in FIG. 2D, when the gas detector 2 detects that the exhaust gas concentration of the negative half axis of the Y-axis is relatively large, the power of the third motor 16 connected to the X-axis exhaust fan 7 remains unchanged, and then the speed of the X-axis exhaust fan 7 remains unchanged. The power of the fourth motor 26 connected to the Y-axis exhaust fan 6 increases, and then the speed of the Y-axis exhaust fan 6 increases. The exhaust gas starts to move from the negative half axis of the Y-axis with high concentration to the positive half axis of the Y-axis with low concentration, and is discharged through the exhaust cylinder 1 at the top center of the exhaust chamber.

Figure 3A:
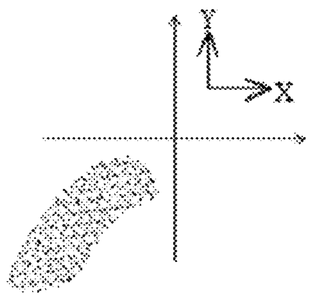
FIG. 3A-D is a schematic diagram of the second concentration distribution of the device for diversion of quenching exhaust gas and the diversion method thereof according to the present invention.

As shown in FIG. 3A, when the gas detector 2 detects that the exhaust gas concentration in the third quadrant of the coordinate system is relatively large, the power of the third motor 16 connected to the X-axis exhaust fan 7 increases, and then the speed of the X-axis exhaust fan 7 increases, moving the exhaust gas toward the positive half axis of the X-axis and ensuring that the exhaust gas is centered in the X direction. The power of the fourth motor 26 connected to the Y-axis exhaust fan 6 increases, and then the speed of the Y-axis exhaust fan 6 increases, moving the exhaust gas toward the positive half axis of the Y-axis and ensuring that the exhaust gas is centered in the Y direction, which realizes that the exhaust gas shares the air duct in the XYZ coordinate system and is discharged through the exhaust cylinder 1 at the top center of the exhaust chamber.

Figure 3B:
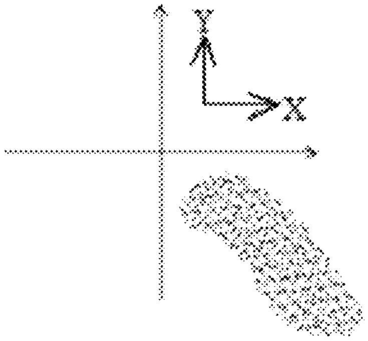

As shown in FIG. 3B, when the gas detector 2 detects that the exhaust gas concentration in the fourth quadrant of the coordinate system is relatively large, the power of the third motor 16 connected to the X-axis exhaust fan 7 is reduced, and then the speed of the X-axis exhaust fan 7 is reduced, moving the exhaust gas toward the negative half axis of the X-axis and ensuring that the exhaust gas is centered in the X direction. The power of the fourth motor 26 connected to the Y-axis exhaust fan 6 increases, and then the speed of the Y-axis exhaust fan 6 increases, moving the exhaust gas toward the positive half axis of the Y-axis and ensuring that the exhaust gas is centered in the Y direction, which realizes that the exhaust gas shares the air duct in the XYZ coordinate system and is discharged through the exhaust cylinder 1 at the top center of the exhaust chamber.

Figure 3C:
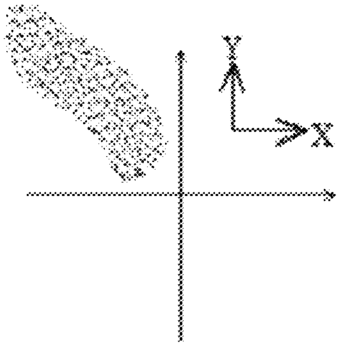

As shown in FIG. 3C, when the gas detector 2 detects that the exhaust gas concentration in the second quadrant of the coordinate system is relatively large, the power of the third motor 16 connected to the X-axis exhaust fan 7 increases, and then the speed of the X-axis exhaust fan 7 increases, moving the exhaust gas toward the positive half axis of the X-axis and ensuring that the exhaust gas is centered in the X direction. The power of the fourth motor 26 connected to the Y-axis exhaust fan 6 decreases, and then the speed of the Y-axis exhaust fan 6 decreases, moving the exhaust gas toward the negative half axis of the Y-axis and ensuring that the exhaust gas is centered in the Y direction, which realizes that the exhaust gas shares the air duct in the XYZ coordinate system and is discharged through the exhaust cylinder 1 at the top center of the exhaust chamber.

Figure 3D:
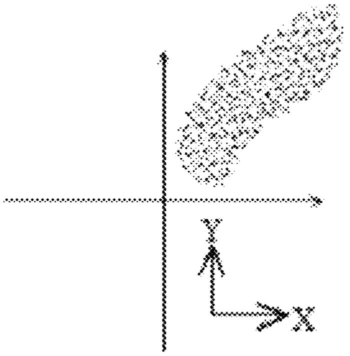

As shown in FIG. 3D, when the gas detector 2 detects that the exhaust gas concentration in the first quadrant of the coordinate system is relatively large, the power of the third motor 16 connected to the X-axis exhaust fan 7 is reduced, and then the speed of the X-axis exhaust fan 7 decreases, moving the exhaust gas toward the negative half axis of the X-axis and ensuring that the exhaust gas is centered in the X direction. The power of the fourth motor 26 connected to the Y-axis exhaust fan 6 decreases, and then the speed of the Y-axis exhaust fan 6 decreases, moving the exhaust gas toward the negative half axis of the Y-axis and ensuring that the exhaust gas is centered in the Y direction, which realizes that the exhaust gas shares the air duct in the XYZ coordinate system and is discharged through the exhaust cylinder 1 at the top center of the exhaust chamber.

Then, start the lifting assembly, adjust the first motor 22 connected to the first screw 15 and the second motor 29 connected to the second screw 25, so that the first screw 15 and the second screw 25 rotate to drive the first slider 17 and the second slider 27 respectively up and down along the first slider support column 14 and the second slider support column 24 at a speed of 0.3 m/s.

Finally, after the exhaust gas is discharged from the exhaust chamber, the third motor 16 connected to the X-axis exhaust fan 7 stops, then the X-axis exhaust fan 7 stops, and the fourth motor 26 connected to the Y-axis exhaust fan 6 stops, and then the Y-axis exhaust fan 6 stops, and then the first slider 17 and the second slider 27 of the lifting assembly drive the X-axis exhaust fans 7 and the Y-axis exhaust fan 6 in the exhaust assembly back to the initial position along the first slider support column 14 and the second slider support column 24 respectively, to complete the reset operation.

The above-mentioned embodiments only describe the preferred embodiments of the present invention, and do not limit the scope of the present invention. Without departing from the design spirit of the present invention, various modifications and improvements made by those skilled in the art to the technical solutions of the present invention shall fall within the protection scope determined by the claims of the present invention.

What is claimed is:

1. A device for diversion of quenching exhaust gas, comprising a quenching chamber, an exhaust gas chamber, a lifting assembly and an exhaust assembly, wherein the exhaust gas chamber is located at the top of the quenching chamber; the quenching chamber is fixedly connected to the exhaust gas chamber through a partition; a support plate in the lifting assembly is fixedly connected to a side of the partition, and a motor in the exhaust assembly is fixedly connected to a slider in the lifting assembly;

the quenching chamber includes a quenching chamber door, an induction coil, a workpiece, a base and a triangular support frame; the quenching chamber door is located on one side of the quenching chamber; one end surface of the quenching chamber door is fixedly connected to a side surface of the quenching chamber; the induction coil and the workpiece are concentric and not in contact; the workpiece is located inside the quenching chamber; an upper surface of the base is fixedly connected to a lower surface of the bottom of the quenching chamber; an upper surface of the top of the quenching chamber and a lower surface of the partition are fixedly connected, and two adjacent sides of the quenching chamber are fixedly connected to a lower surface of the first support plate and a lower surface of the second support plate through the triangular support frame respectively;

the exhaust gas chamber includes an exhaust gas chamber door, a sealing brush, a partition, an exhaust cylinder and a gas detector; the exhaust gas chamber door is located on one side of the exhaust gas chamber; one end surface of the exhaust gas chamber door and one side surface of the exhaust gas chamber are fixedly connected; the partition is provided with a cylindrical through-hole at a position corresponding to the workpiece, a side corner of the partition is provided with a small opening, a bottom surface of the bottom of the exhaust gas chamber and an upper surface of the partition are fixedly connected, the sealing brush is located on two adjacent sides of the exhaust gas chamber, and the exhaust cylinder is located at the center of the upper surface of the top of the exhaust gas chamber, the gas detector is located inside the exhaust chamber, on one side near the top;

the exhaust assembly includes a Z-axis exhaust fan, a Y-axis exhaust fan, an X-axis exhaust fan, a third motor, a fourth motor, and a fifth motor; an input end of the X-axis exhaust fan is fixedly connected to an output end of the third motor through the sealing brush, a housing of the third motor is fixedly connected to the middle of a first slider, and an input end of the Y-axis exhaust fan is fixedly connected to an output end of the fourth motor through the sealing brush, a housing of the fourth motor is fixedly connected to the middle of a second slider, an input end of the Z-axis exhaust fan is fixedly connected to an output end of the fifth motor, a housing of the fifth motor is fixedly connected to a lower surface of the top of the exhaust chamber; and the lifting assembly includes a first baffle, a first slider support column, a first screw, a first slider, a first motor support seat, and a first support plate, a second baffle, a second slider support column, a second screw, a second slider, a second motor support seat, a second support plate, a first motor and a second motor; a first end of the first slider support column and the first motor support seat are respectively located on an upper surface of the first support plate, and a first end of the first screw is fixedly connected to the first motor through the first motor support seat, a first end of the second slider support column and the second motor support seat are respectively located on an upper surface of the second support plate, and a first end of the second screw is fixedly connected to the second motor through the second motor support seat; a second end of the first slider support column and a second end of the second slider support column are fixedly connected to a lower surface of the first baffle and the lower surface of the second baffle through the cylindrical hole of the first slider and the cylindrical hole of the second slider respectively; a second end of the first screw and a second end of the second screw are fixedly connected to a lower surface of the first baffle and a lower surface of the second baffle through a threaded hole of the first slider and a threaded hole of the second slider respectively.

2. The device for diversion of quenching exhaust gas according to claim 1, wherein a thickness of the first support plate, a thickness of the second support plate, and a thickness of the partition are equal.

3. The device for diversion of quenching exhaust gas according to claim 1, wherein axes of the X-axis exhaust fan and the Y-axis exhaust fan are parallel to the upper surface of the partition, and an axis of the Z-axis exhaust fan is perpendicular to the upper surface of the partition.

4. The device for diversion of quenching exhaust gas according to claim 1, wherein cross-sections of the first slider and the second slider have a "T" structure; one side surface of the first slider and one side surface of the second slider are respectively provided with a cylindrical hole and a threaded hole; a diameter of the cylindrical hole of the first slider and a diameter of the cylindrical hole of the second slider are respectively equal to an outer diameter of the first slider support column and an outer diameter of the second slider support column; the threaded hole of the first slider and the threaded hole of the second slider are threaded with the first screw and the second screw, respectively.

5. The device for diversion of quenching exhaust gas according to claim 1, wherein an axis of the first slider support column and an axis of the first screw are parallel to each other, and an axis of the second slider support column and an axis of the second screw are parallel to each other; the first baffle and the first support plate are parallel to each other, and the second baffle and the second support plate are parallel to each other.

6. A diversion method using the device for diversion of quenching exhaust gas according to claim 1, comprising the following steps:

S1, after the exhaust gas is produced by quenching the workpiece, the third motor connected to the X-axis exhaust fan, the fourth motor connected to the Y-axis exhaust fan and the fifth motor connected to the Z-axis exhaust fan are started so that they start running at a power of 2 kw respectively;

S2, start the gas detector in machine vision to monitor the concentration of exhaust gas discharged from the quenching chamber to the exhaust chamber in real time;

S3, according to the exhaust gas concentration monitored by the gas detector, the power of the third motor connected to the X-axis exhaust fan and the fourth motor connected to the Y-axis exhaust fan is adjusted in real time, and the power of the X-direction exhaust fan and Y-direction exhaust fan is changed in real time by comparison of the X-direction and Y-direction exhaust gas concentrations in the exhaust gas chamber by the gas detector, and the power adjustment range of the X direction exhaust fan and the Y direction exhaust fan is 2~2.5 kw;

S31, when the gas detector detects that the exhaust gas concentration of the negative half axis of the X-axis is relatively large, the power of the third motor connected to the X-axis exhaust fan is increased, and then the speed of the X-axis exhaust fan increases; the power of the fourth motor connected to the Y-axis exhaust fan remains unchanged, and then the speed of the Y-axis exhaust fan remains unchanged; the exhaust gas starts to move from the negative half axis of the X-axis with high concentration to the positive half axis of the X-axis with low concentration, and is discharged through the exhaust cylinder at the top center of the exhaust chamber;

S32, when the gas detector detects that the exhaust gas concentration of the positive half axis of the X-axis is relatively large, the power of the third motor connected to the X-axis exhaust fan is reduced, and then the speed of the X-axis exhaust fan decreases; the power of the fourth motor connected to the Y-axis exhaust fan remains unchanged, and then the speed of the Y-axis exhaust fan remains unchanged; the exhaust gas starts to move from the positive half axis of the X-axis with high concentration to the negative half axis of the X-axis with low concentration, and is discharged through the exhaust cylinder at the top center of the exhaust chamber;

S33, when the gas detector detects that the exhaust gas concentration of the positive half axis of the Y-axis is relatively large, the power of the third motor connected to the X-axis exhaust fan remains unchanged, and then the speed of the X-axis exhaust fan remains unchanged; the power of the fourth motor connected to the Y-axis exhaust fan is reduced, and then the speed of the Y-axis exhaust fan decreases; the exhaust gas starts to move from the positive half axis of the Y-axis with high concentration and the negative half axis of the Y-axis with low concentration, and is discharged through the exhaust cylinder at the top center of the exhaust chamber;

S34, when the gas detector detects that the exhaust gas concentration of the negative half axis of the Y-axis is relatively large, the power of the third motor connected to the X-axis exhaust fan remains unchanged, and then the speed of the X-axis exhaust fan remains unchanged; the power of the fourth motor connected to the Y-axis exhaust fan increases, and then the speed of the Y-axis exhaust fan increases; the exhaust gas starts to move from the negative half axis of the Y-axis with high concentration to the positive half axis of the Y-axis with low concentration, and is discharged through the exhaust cylinder at the top center of the exhaust chamber;

S35, when the gas detector detects that the exhaust gas concentration in the third quadrant of the coordinate system is relatively large, the power of the third motor connected to the X-axis exhaust fan increases, and then the speed of the X-axis exhaust fan increases; the power of the fourth motor connected to the Y-axis exhaust fan increases, and then the speed of the Y-axis exhaust fan increases; the exhaust gas starts to move from the third quadrant with high concentration to the positive half axis of the X-axis and the positive half axis of the Y-axis with low concentration, and is discharged through the exhaust cylinder at the top center of the exhaust chamber;

S36, when the gas detector detects that the exhaust gas concentration in the fourth quadrant of the coordinate system is relatively large, the power of the third motor connected to the X-axis exhaust fan is reduced, and then the speed of the X-axis exhaust fan is reduced; the power of the fourth motor connected to the Y-axis exhaust fan increases, and then the speed of the Y-axis exhaust fan increases; the exhaust gas starts to move from the fourth quadrant with high concentration to the negative half axis of the X-axis and the positive half axis of the Y-axis with low concentration, and is discharged through the exhaust cylinder at the top center of the exhaust chamber;

S37, when the gas detector detects that the exhaust gas concentration in the second quadrant of the coordinate system is relatively large, the power of the third motor connected to the X-axis exhaust fan increases, and then the speed of the X-axis exhaust fan increases; the power of the fourth motor connected to the Y-axis exhaust fan decreases, and then the speed of the Y-axis exhaust fan decreases; the exhaust gas starts to move from the second quadrant with high concentration to the positive half axis of the X-axis and the negative half axis of the Y-axis with low concentration, and is discharged through the exhaust cylinder at the top center of the exhaust chamber;

S38, when the gas detector detects that the exhaust gas concentration in the first quadrant of the coordinate system is relatively large, the power of the third motor connected to the X-axis exhaust fan is reduced, and then the speed of the X-axis exhaust fan decreases; the power of the fourth motor connected to the Y-axis exhaust fan 6 decreases, and then the speed of the Y-axis exhaust fan decreases; the exhaust gas starts to move from the first quadrant with high concentration to the negative half axis of the X-axis and the negative half axis of the Y-axis with low concentration, and is discharged through the exhaust cylinder at the top center of the exhaust chamber;

S4, start the lifting assembly, adjust the first motor connected to the first screw and the second motor connected to the second screw, so that the first screw and the second screw rotate to drive the first slider and the second slider respectively up and down along the first slider support column and the second slider support column at a speed of 0.2-0.3 m/s;

S5, after the exhaust gas is discharged from the exhaust chamber, the third motor connected to the X-axis exhaust fan stops, then the X-axis exhaust fan stops, and the fourth motor connected to the Y-axis exhaust fan stops, and then the Y-axis exhaust fan stops, and then the first slider and the second slider of the lifting assembly drive the X-axis exhaust fans and the Y-axis exhaust fan in the exhaust assembly back to the initial position along the first slider support column and the second slider support column respectively, to complete the reset operation.

* * * * *